(12) United States Patent
Stoica et al.

(10) Patent No.: US 12,556,245 B2
(45) Date of Patent: Feb. 17, 2026

(54) JOINT COMMUNICATIONS AND SENSING SIGNALING AND PROCESSING BETWEEN COMMUNICATIONS DEVICES

(71) Applicant: Lenovo (Singapore) Pte Limited, Singapore (SG)

(72) Inventors: Razvan-Andrei Stoica, Essen (DE); Seyedomid Taghizadeh Motlagh, Oberursel (DE); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 15 days.

(21) Appl. No.: 18/792,931

(22) Filed: Aug. 2, 2024

(65) Prior Publication Data
US 2026/0039340 A1    Feb. 5, 2026

(51) Int. Cl.
*H04B 7/02* (2018.01)
*H04B 7/0456* (2017.01)
*H04L 1/00* (2006.01)

(52) U.S. Cl.
CPC ......... *H04B 7/0456* (2013.01); *H04L 1/0071* (2013.01)

(58) Field of Classification Search
CPC .............................. H04B 7/0456; H04L 1/0071
USPC ........................................................ 375/267
See application file for complete search history.

(56) References Cited

U.S. PATENT DOCUMENTS

| 11,638,258 B2 * | 4/2023 | Bayesteh | G01S 7/0234 |
|---|---|---|---|
| | | | 370/336 |
| 2023/0388815 A1 * | 11/2023 | Jeon | H04B 17/336 |
| 2025/0251488 A1 * | 8/2025 | Huang | G01S 7/0234 |

FOREIGN PATENT DOCUMENTS

| WO | 2023205961 A1 | 11/2023 |
| WO | WO 2024100639 A1 * | 5/2024 |

OTHER PUBLICATIONS

PCT Invitation to Pay Additional Fees dated Sep. 30, 2025 for International Application No. PCT/I B2025/057877.

* cited by examiner

*Primary Examiner* — Helene E Tayong
(74) *Attorney, Agent, or Firm* — AMPACC Law Group, PLLC

(57) ABSTRACT

Various aspects of the present disclosure relate to utilizing non-orthogonal multiplexing of both communications and sensing signals between transmission nodes and receiving nodes and over available physical resources. In some embodiments, the present disclosure describes a scalable transform-based multiplexing precoder for joint communications and sensing signals.

20 Claims, 12 Drawing Sheets

JOINT COMMUNICATIONS AND SENSING SIGNALING AND PROCESSING BETWEEN COMMUNICATIONS DEVICES

TECHNICAL FIELD

The present disclosure relates to wireless communications, and more specifically to joint communications and sensing signaling and processing between communications devices.

BACKGROUND

A wireless communications system may include one or multiple network communication devices, such as base stations, which may support wireless communications for one or multiple user communication devices, which may be otherwise known as user equipment (UE), or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers, or the like). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

The wireless communications system, via the various communication devices, can perform radio sensing to improve network performance and/or serve various use cases or associated services. Radio sensing operates to obtain environment information by using radio-frequency (RF) signaling to detect objects or areas within an environment, such as a physical location or environment that includes a UE or other user devices.

For example, a radio sensing mechanism, scheme, or technique can include: transmission of a sensing excitation signal (e.g., a sensing reference signal (RS)) from a sensing Tx node (e.g., a network entity or UE), reception of reflections/echoes of the transmitted sensing excitation signal from the environment by a sensing Rx node (e.g., a network entity or UE), and/or processing of the received reflections to infer information from the environment or objects within the environment.

SUMMARY

An article "a" before an element is unrestricted and understood to refer to "at least one" of those elements or "one or more" of those elements. The terms "a," "at least one," "one or more," and "at least one of one or more" may be interchangeable. As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The present disclosure relates to methods, apparatuses, and systems that facilitate joint communications and sensing signaling and processing between communications devices.

Some implementations of the method and apparatuses described herein may further include a transmission node for wireless communication, comprising at least one memory, and at least one processor coupled with the at least one memory and configured to cause the transmission node to determine a precoder for two or more sets of symbols, including a first set of symbols associated with an information source, and a second set of symbols associated with a sensing reference source, and generate a communication and sensing signal by applying the precoder to a set of independent symbols generated from the two or more sets of symbols.

In some implementations of the method and apparatuses described herein, the generated communication and sensing signal combines the first set of symbols and the second set of symbols.

In some implementations of the method and apparatuses described herein, the at least one processor is further configured to cause the transmission node to map the generated communication and sensing signal to at least one transmission layer and a set of physical transmission resources, and transmit, to a receiving node, an indication of a configuration of the generated communication and sensing signal.

In some implementations of the method and apparatuses described herein, the configuration of the generated communication and sensing signal includes a first information element that indicates the determined precoder, and a second information element that indicates the first set of symbols or the second set of symbols.

In some implementations of the method and apparatuses described herein, the first information element indicates at least one of: one or more truncated discrete Fourier transform (DFT) columns of a base DFT precoder, one or more truncated DFT rows of a base DFT precoder, a size indication of the base DFT precoder, a precoder type, a tabulated indication of an applied precoder from one or more available precoder realizations;, and an applied permutation to the two or more sets of symbols as inputs to the precoder.

In some implementations of the method and apparatuses described herein, the second information element indicates at least one of: an index subset mapping the subset of independent symbols generated from the second set of symbols, symbol values of the subset of independent symbols selected via the index subset, a type of the second set of symbols, and an applied permutation to the two or more sets of symbols as inputs to the precoder.

In some implementations of the method and apparatuses described herein, the at least one processor is configured to cause the transmission node to obtain the generated communication and sensing signal by performing linear precoding via the determined precoder.

In some implementations of the method and apparatuses described herein, the at least one processor is configured to cause the transmission node to generate a first subset of the set of independent symbols that comprises a communications signal component and generate a second subset of the set of independent symbols that comprises a sensing reference signal component.

In some implementations of the method and apparatuses described herein, the at least one processor is further configured to cause the transmission node to non-orthogonally multiplex the communications signal component and the sensing reference signal component.

In some implementations of the method and apparatuses described herein, the at least one processor is further configured to cause the transmission node to compress and spread the set of independent symbols onto a transmission layer and a set of physical transmission resources.

In some implementations of the method and apparatuses described herein, the at least one processor is further configured to cause the transmission node to obtain the determined precoder via a truncated DFT.

In some implementations of the method and apparatuses described herein, the at least one processor is further configured to cause the transmission node to obtain the determined precoder via a spherical codebook S(N+P, N, t) that comprises: at least N+P codewords selected on a surface of a complex unit N-sphere with a minimum angular distance limited by a threshold acos(t), wherein N is a number of independent symbols generated by the first set of symbols and further represents at least a number of physical transmission resources, and wherein P is a number of independent symbols generated by the second set of symbols.

In some implementations of the method and apparatuses described herein, the at least one processor is further configured to cause the transmission node to apply a permutation to the set of independent symbols before generating the communication and sensing signal.

In some implementations of the method and apparatuses described herein, the permutation includes mixing the set of independent symbols by appending independent symbols generated from the second set of symbols to independent symbols generated from the first set of symbols, block interleaving the independent symbols generated from the first set of symbols with the independent symbols generated from the second set of symbols, element-wise interleaving the independent symbols generated from the first set of symbols with the independent symbols generated from the second set of symbols, or combinations thereof.

Some implementations of the method and apparatuses described herein may further include a receiving node for wireless communication, comprising at least one memory, and at least one processor coupled with the at least one memory and configured to cause the receiving node to receive a communication and sensing signal that comprises a precoded set of independent symbols generated from two or more sets of symbols, including a first set of symbols associated with an information source, and a second set of symbols associated with a sensing reference source, receive an indication of a configuration associated with the communication and sensing signal, apply the configuration to cancel interference of a signal component from the communication and sensing signal to generate an interference-free signal component, and perform a detection and estimation task that is based on the interference-free signal component.

In some implementations of the method and apparatuses described herein, a first subset of the precoded set of independent symbols comprises a communications signal component, and a second subset of the precoded set of independent symbols comprises a sensing reference signal component.

In some implementations of the method and apparatuses described herein, the configuration of the communication and sensing signal includes a first information element that indicates a precoder used to combine the two or more sets of symbols, and a second information element that indicates the first set of symbols or the second set of symbols.

In some implementations of the method and apparatuses described herein, the detection and estimation task comprises: recovering a subset of the precoded set of independent symbols that originates from the first set of symbols by cancelling the interference of the second set of symbols corresponding to the sensing reference source from the communications and sensing signal, or recovering a set of sensing parameters of a physical propagation medium based on a subset of the precoded set of independent symbols that originates from the second set of symbols corresponding to the sensing reference source by cancelling the interference of the first set of symbols from the communications and sensing signal.

Some implementations of the method and apparatuses described herein may further include a processor for wireless communication, comprising at least one controller coupled with at least one memory and configured to cause the processor to determine a precoder for two or more sets of symbols, including: a first set of symbols associated with an information source, and a second set of symbols associated with a sensing reference source, and generate a communication and sensing signal by applying the precoder to a set of independent symbols generated from the two or more sets of symbols.

Some implementations of the method and apparatuses described herein may further include a method performed by a network node, the method comprising receiving a communication and sensing signal that comprises a precoded set of independent symbols generated from two or more sets of symbols, including: a first set of symbols associated with an information source, and a second set of symbols associated with a sensing reference source, receiving an indication of a configuration associated with the communication and sensing signal, applying the configuration to cancel interference of a signal component from the communication and sensing signal to generate an interference-free signal component, and performing a detection and estimation task that is based on the interference-free signal component.

DETAILED DESCRIPTION

A wireless communication system may support the integration of radio sensing with information communications, which can improve network performance and facilitate or serve various vertical use-cases enabled by a radio access network. For example, the wireless communications system may deploy joint communications and sensing, such as the functional integration of radio sensing with the communications functionality of the network.

To effectively utilize joint communications and sensing, the wireless communications system integrates sensing references signals with communications signals at a physical layer without degrading the communications signals. To do so, the system may utilize multiplexing and access physical network resources of the physical layer.

For example, the system may employ non-orthogonal multiplexing of both the communications and sensing signals over available resources to ensure a low degradation of communication performance while implementing sensing as over-the-top physical signaling. In some embodiments, the system implements a scalable transform-based multiplexing precoder for the communications and sensing signals.

Using the precoder, the system may expand upon existing radio transceiver modules with functional additions to support various multiplexing schemes when generating joint communications and sensing signals. Thus, the system may efficiently implement joint communications and sensing for various communication devices (e.g., NEs and/or UEs) in an efficient manner, enabling sensing functionality while preserving/enhancing the spectral and energy efficiency of a network, among other benefits.

Aspects of the present disclosure are described in the context of a wireless communications system.

Figure 1:
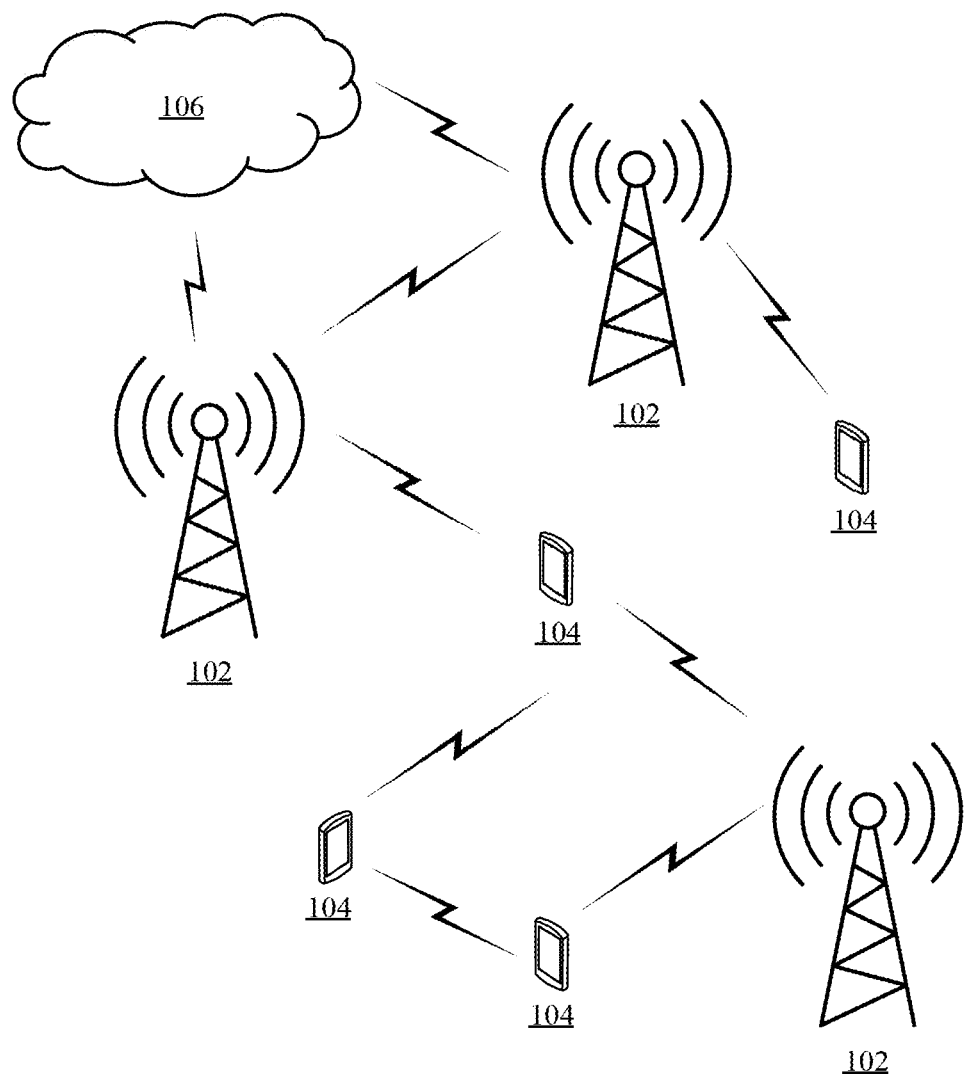
FIG. 1 illustrates an example of a wireless communications system in accordance with aspects of the present disclosure.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a NR network, such as a 5G network, a 5G-Advanced (5G-A) network, or a 5G ultrawideband (5G-UWB) network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UE 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N2, or network interface). In some implementations, the NE 102 may communicate with each other directly. In some other implementations, the NE 102 may communicate with each other or indirectly (e.g., via the CN 106. In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management (e.g., data bearers, signal bearers, etc.) for the one or more UEs 104 served by the one or more NE 102 associated with the CN 106.

The CN 106 may communicate with a packet data network over one or more backhaul links (e.g., via an S1, N2, N2, or another network interface). The packet data network may include an application server. In some implementations, one or more UEs 104 may communicate with the application server. A UE 104 may establish a session (e.g., a protocol data unit (PDU) session, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu=0$) may be associated with a first subcarrier spacing (e.g., 15 kHz) and a normal cyclic prefix. In some implementations, the first numerology (e.g., $\mu=0$) associated with the first subcarrier spacing (e.g., 15 kHz) may utilize one slot per subframe. A second numerology (e.g., $\mu=1$) may be associated with a second subcarrier spacing (e.g., 30 kHz) and a normal cyclic prefix. A third numerology (e.g., $\mu=2$) may be associated with a third subcarrier spacing (e.g., 60 kHz) and a normal cyclic prefix or an extended cyclic prefix. A fourth numerology (e.g., $\mu=3$) may be associated with a fourth subcarrier spacing (e.g., 120 kHz) and a normal cyclic prefix. A fifth numerology (e.g., $\mu=4$) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., $\mu=0$, $\mu=1$, $\mu=2$, $\mu=3$, $\mu=4$) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively. Each slot may include a number (e.g., quantity) of symbols (e.g., OFDM symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., $\mu=0$) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHz), FR2 (24.25 GHz-52.6 GHz), FR3 (7.125 GHz-24.25 GHz), FR4 (52.6 GHz-114.25 GHz), FR4a or FR4-1 (52.6 GHz-71 GHz), and FR5 (114.25 GHz-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., $\mu=0$), which includes 15 kHz subcarrier spacing; a second numerology (e.g., $\mu=1$), which includes 30 kHz subcarrier spacing; and a third numerology (e.g., $\mu=2$), which includes 60 kHz subcarrier spacing. FR2 may be associated with one or multiple numerologies (e.g., at least 2 numerologies). For example, FR2 may be associated with a third numerology (e.g., $\mu=2$), which includes 60 kHz subcarrier spacing; and a fourth numerology (e.g., $\mu=3$), which includes 120 kHz subcarrier spacing.

As described herein, the systems and methods introduce a scalable transform-based multiplexing precoder for communications and sensing signals. The precoder, in some cases, compresses a signaling space to a fixed spectral pool of resources (e.g., resource elements, resource blocks or equivalent spectrum entities) to accommodate non-orthogonal communications and sensing signals (e.g., sensing RSs), while minimizing intra-signal interference levels. Thus, joint signaling can funnel more information and/or sensing signaling simultaneously over existing orthogonal resources of a communications link within a wireless communications system.

However, issues can arise when utilizing joint communications and sensing signaling, because the two signaling types compete for common physical resources and can deplete the orthogonal resources (e.g., frequency sub-bands/ sub-carriers, spatial degrees of freedom, time slots, and so on) of a shared or common channel. The disclosed precoder and its implementation overcomes such issues and provides a flexible approach to the use of joint signaling while preserving spectral efficiency and/or increasing spectrum functionality of the wireless communications system.

Figure 2:
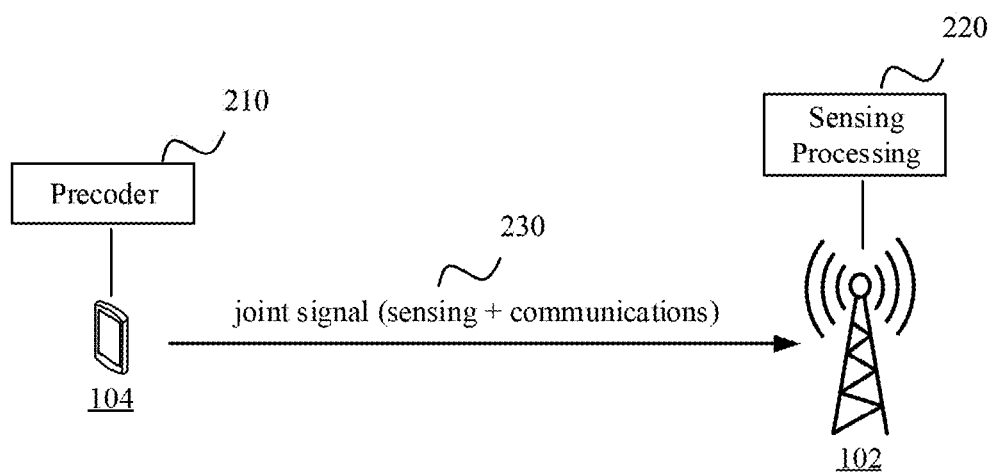
FIG. 2 illustrates an example diagram illustrating joint communications and sensing signaling and processing between communications devices in accordance with aspects of the present disclosure.

FIG. 2 illustrates an example diagram 200 illustrating joint communications and sensing signaling and processing between communications devices in accordance with aspects of the present disclosure. The UE 104, being a transmitting device (e.g., a Tx node), generates and transmits a joint signal 230 to the NE 102 (e.g., a base station), being a receiving device (e.g., an Rx node). A precoder 210 of the UE 104 precodes the joint signal, which includes two components, a communications signal and a sensing signal. Various sensing processing components 220 receive the joint signal 230 and process the joint signal 230 to extract the signals, detect the communications data, and/or perform various sensing tasks (e.g., detection, estimation, and so on).

The communications devices, which may act as either the Rx node or the Tx node, may implement various multiplexing schemes, such as orthogonal frequency-division multiplexing (OFDM) in either a multi-carrier format (e.g., implemented in 5G NR) or a single carrier format (e.g., DFT-spread-OFDM).

The precoder 210, therefore, may generate the joint signal via non-orthogonal multiplexing. The precoder 210, represented as a linear precoder (W), performs transform-based multiplexing of an input communications signals (e.g., independent symbols) with an input sensing signal (e.g., a sensing RS or sensing symbols) to orthogonal channel resources, such as OFDM symbols.

Figure 3:
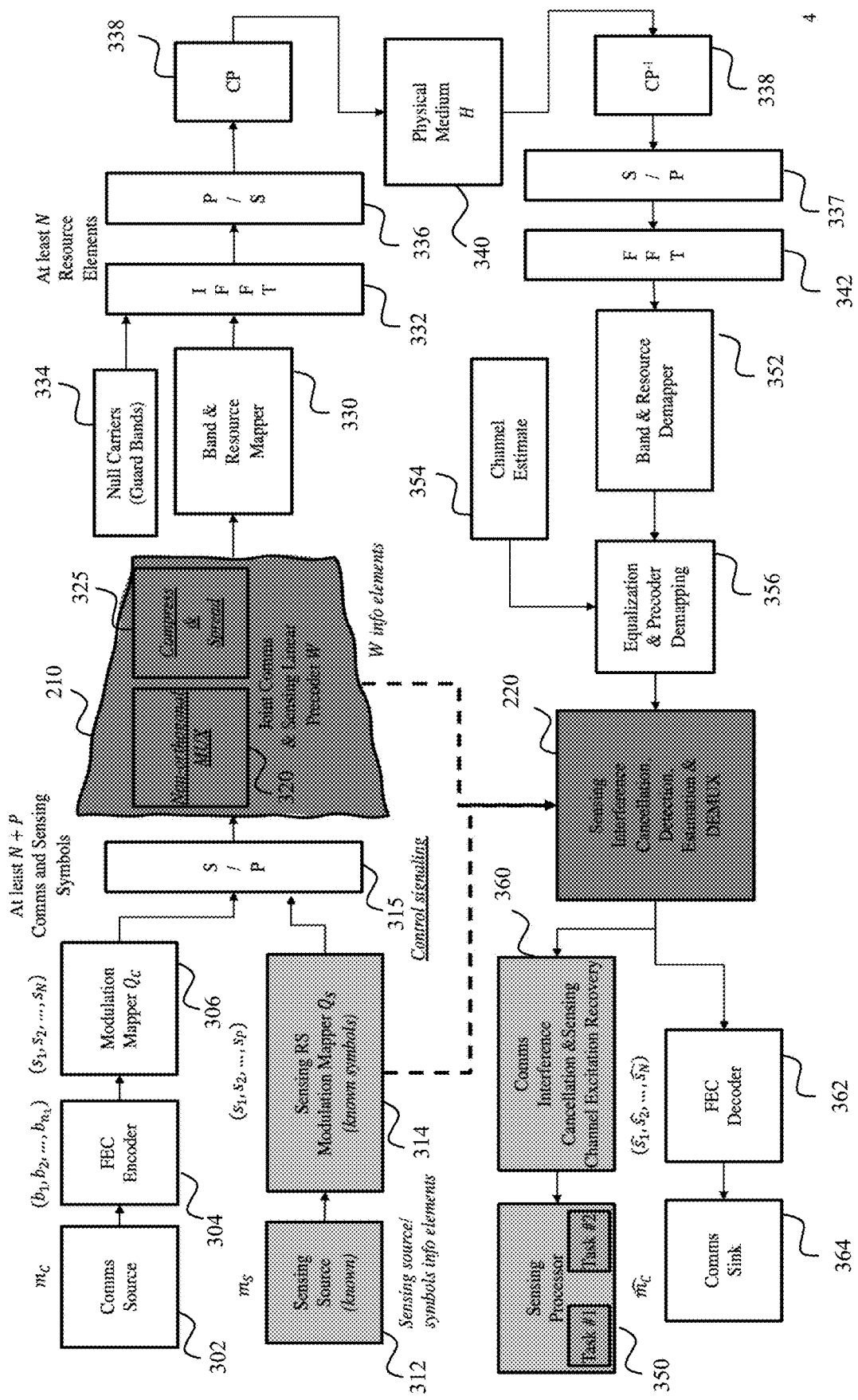
FIG. 3 illustrates an example system realization of a multiplexing scheme for non-orthogonal joint communications and sensing signaling in accordance with aspects of the present disclosure.

FIG. 3 illustrates an example multiplexing scheme 300 for non-orthogonal joint communications in accordance with aspects of the present disclosure. The precoder 210 may be an information funnel that minimizes intra-signal space interference (e.g., interference between the communications and sensing signal components) over an underlying OFDM-based waveform. For example, the precoder 210 performs signal space compression, with resulting interference being appropriately managed to reduce signal self-interference effects. In some cases, a codebook may be a set of precoding weights, or vectors, that comprise the precoder 210.

In some cases, the precoder 210 is represented by S(N, N+P, t), such that:
  N is the resulting signal space dimensionality (e.g., number of output symbols to be mapped to orthogonal signal space resources corresponding to the precoded joint communications and sensing signal);
  N+P is the input signal space dimensionality, such as the signal space of the communications signals and the sensing signals (e.g., number of communications input symbols, and number of sensing reference symbols, respectively); and
  t represent a maximum magnitude of self-interference, considering W column vectors to be normalized to a unit norm.

In some cases, N is a number of subcarriers/resource elements (REs) allocated and used for communications. Generally, N may be the number of medium resources that carry the output of the communications and sensing signals multiplexing. For example, the resources may be frequency sub-carriers, time slots, spatial layers or antenna ports, or combinations thereof. In some cases, N+P is the number of communications symbols and sensing RS symbols multiplexed and jointly compressed onto the N orthogonal physical signal space corresponding to the available medium resources available.

An Rx node, such as the NE 102 and associated processing components 220, may resolve self-interference in the signal space via various mechanisms, including:
  forward interference cancellation based on a known sensing reference signal configuration (e.g., known sensing RS symbols assigned to the UE 104, known sensing RS symbols assigned to a sensing task, and so on); and/or
  uniform self-interference distribution across the signal space (e.g., knowledge of the precoder W, where W is optimized such that the communications to sensing signal-to-interference ratio (SINR), or reversely, sensing to communications SINR, is fairly controlled and uniformly distributed via the design of the precoder W).

The Rx node, under such conditions and after OFDM demodulation, demapping and equalization, may remove the sensing interference onto the communications signal elements by forward interference cancellation and perform detection of the communications input symbols. The detection mechanisms may undergo least squares filtering, followed by W matched filtering, least squares, linear minimum mean square filtering, other linear-based detection filtering, non-linear detection filtering, or any combinations thereof.

As described herein, the Rx node, via a sensing processor 350, may perform various sensing tasks, such as report sensing measurement quantities (e.g., angle, energy/power, Doppler shift of one or more channel paths associated to a sensing target or a defined condition/value range, and so on).

In some cases, the Tx nodes and/or the Rx nodes may transmit or receive one or more transmission/reception/reporting configuration parameters (e.g., describing the sensing RS generation and multiplexing), report configuration of a radio node performing as a sensing Rx, transmit the report of the sensing measurement quantities by a radio node performing as a sensing Rx, and so on.

In some cases, a SensMF (e.g., a sensing management/configuration entity residing in core or in RAN) node may act as an Rx or Tx node.

In some cases, the Tx node and/or Rx nodes may communication via uplink (UL), downlink (DL), or sidelink (SL) physical data and/or control channels defined within a communication network, such as new radio physical broadcast channel (NR PBCH), physical downlink shared channel (PDSCH), physical downlink control channel (PDCCH), physical uplink shared channel (PUSCH), physical uplink control channel (PUCCH), physical sidelink broadcast channel (PSBCH), physical sidelink control channel (PSCCH), physical sidelink shared channel (PSSCH), via a higher layer (e.g., a MAC control element (MAC-CE) or radio resource control (RRC) messages) signaling, where a radio node and/or sensing Rx and/or sensing Tx node is the UE 104;
  via a logical interface between the SensMF and the sensing Tx/Rx nodes; and so on.

The precoder 210 receives combined communications and sensing symbols, such as N+P symbols, at a serial-to-parallel (S/P) synchronization component. A communications source 302 generates communications symbols. For example, the communications source 302 generates information bits that are mapped to constellation points, or alternatively symbols, according to a configuration having a first constellation mapping.

The information symbols may include gray coded constellation points corresponding to the first constellation mapping as an image of the input information bits generated by the source 302. The information bits are sent to a forward error correction (FEC) encoder 304, which performs linear encoding of the input symbols and transmits the linearly encoded symbols to a modulation mapper (Qc) 306. The modulation mapper 306 produces complex-value modulation symbols.

A sensing source 312 generates sensing symbols and transmits symbols (e.g., sensing information elements). The symbols of the sensing source 312 are mapped to constellation points that correspond to a second constellation mapping. The second constellation mapping may be part of the same configuration as the first constellation mapping, or alternatively, formed as a second separate configuration. The second constellation mapping may be the same as the first constellation mapping (e.g., the constellation used for the sensing symbols, $s_S$, is the same as the constellation used for the information communication symbols, $s_C$, such as 16-QAM, or other QAM constellations of different orders). In some cases, the second constellation mapping may be distinct from the first constellation mapping (e.g., the constellation used for the sensing symbols, $s_S$, is for example a 4-QAM/4-PSK constellation and the constellation used for the communications symbols, $s_C$, is for example a 16-QAM constellation).

The sensing symbols may be sent to a sensing RS modulation mapper 306, which generates complex-value modulation symbols of the sensing symbols. The precoder 210 receives the combined symbols (e.g., N+P symbols).

In some embodiments, the precoder 210 jointly precodes the communications symbols, $s_C$, and the sensing symbols, $s_S$. For example, the precoder 210, via a non-orthogonal multiplexer 320, multiplexes the combined symbols via linear transform-based precoding. As a result, a total of at least N communications symbols, $s_C$, and at least P sensing symbols, $s_P$, (or sensing RS, sensing pilots, and so on) are multiplexed and compressed together (e.g., via a compression and spread component 325) to N parallel output symbols (or precoded joint communications and sensing symbols x). Thus, the N+P inputs to the multiplexing non-orthogonal linear precoder W, corresponding to $s_C$ communication symbols and $s_S$ sensing symbols may comprise:

- in a sequence, the N communication symbols followed by the P sensing symbols;
- in block sequences, the N communications symbols blocked interleaved with the P sensing symbols, where the size of the blocks, $b_C$ and $b_S$, is determined by configuration;
- by permutation, where a permutation of the N communications symbols is multiplexed with a permutation of the P sensing symbols; and/or various combinations.

In some cases, a signal model obtained after precoding with the multiplexing non-orthogonal linear precoder W is given by x=W·s, where the input vector $$s = \begin{bmatrix} s_C \\ s_S \end{bmatrix}$$

of dimensions N+P corresponds to the non-zero inputs to the linear precoder 210 and comprise both communications and sensing signals, and the output vector x corresponds to the yielded, or alternatively precoded, joint communications and sensing signal.

The vector s may embed the sensing symbols components $s_S$ at positions S, with |S|=P, the communications symbols components $s_C$ at the positions C with |C|=N, and respectively S∩C=∅, and S∪C={1, 2, 3, . . . , N+P}. As such, the sets S and C corresponding to the indices of the sensing and communications symbols are disjoint and complementary with respect to the set of integer non-negative indices up to N+P, such as the input signal space dimensionality.

In some cases, the N precoded communications and sensing symbols x are mapped, via a band and resource mapper 330, to at least N inputs of an OFDM modulator, such as an inverse fast Fourier transform (IFFT) 332. The mapping may be "in sequence," such that each of the N precoded communications and sensing symbols is mapped to a corresponding, in-order, input to the IFFT 332. Alternatively, the mapping may be "permuted," such that each of the N precoded communications and sensing symbols is interleaved and mapped to one of the inputs to the OFDM modulator. The OFDM modulation (e.g., via a IFFT linear transform, $$D_N^H)$$

may accept at least N inputs. In some cases, null carriers 334, such as silent tones or guard bands, may be additionally added to the N precoded communications and sensing symbols as inputs to the IFFT 332. The silent tones may act, for example, as sub-band guards.

In one example, the resulting baseband OFDM signal is:

$$x_{BB} = D_N^H \cdot x = D_N^H \cdot W \cdot \begin{bmatrix} s_C \\ s_S \end{bmatrix} = D_N^H \cdot W \cdot s.$$

The ODFM symbols, which comprise the precoded N joint communications and sensing symbols may be provided to additional OFDM transmitter processing steps, such as serialization (e.g., via a P/S 336), cyclic prefix insertion 338, corresponding RF antenna/MIMO layer processing (including RF beamforming), up-conversion and transmission over a physical medium 340, such as a wireless physical channel.

In some embodiments, the linear precoding for non-orthogonal multiplexing of the joint communications and sensing signals may be performed by a truncated discrete Fourier transform (DFT) filter, or a truncated fast Fourier transform (FFT filter), such as the FFT 410. For example, truncation of the DFT for the linear precoder 210 for non-orthogonally multiplexing joint communications and sensing signals of dimensionality N+P may be performed starting from at least an N+P-point DFT as a donor DFT. The donor DFT transform is truncated by removing at least P rows to warrant a linear transform that accepts at least N+P non-zero inputs (e.g., the communications and sensing signals) and outputs at least N outputs (e.g., the precoded joint communications and sensing signal).

Thus, the linear transform W may be sampled out of the N+P-point DFT by truncating the latter by P rows and renormalizing the column vectors norm to unit norm by a factor $$\sqrt{\frac{N+P}{N}}$$

to obtain:

$$W = \sqrt{\frac{N+P}{N}} \cdot [w_{N+P}^0 \; w_{N+P}^1 \; \ldots \; w_{N+P}^j \; \ldots \; w_{N+P}^{N+P-1}]$$

with the column vectors $$w_{N+P}^j, 0 \le i \le N+P$$

comprising each of the N+P column vectors of the N+P-point DFT pruned by P entries corresponding to the P pruned rows. The linear precoder W has properties of a harmonic spherical code, $$S(N, N+P, \max|w_{N+P}^{i,H} \cdot w_{N+P}^j|), i \ne j, 0 \le i, j \le N+P,$$

limited to the maximum threshold $$\max|w_{N+P}^{i,H} \cdot w_{N+P}^j|,$$

with self-interference introduced by multiplexing the communications signals, $s_C$, and sensing signals, $s_S$, into the joint communications and sensing signal, x.

In some cases, the P rows selected to be truncated out of the t N+P rows available are statically, or semi-statically, determined by a configuration based on an optimization algorithm targeting the minimization of the maximum self-interference $$\max|w_{N+P}^{i,H} \cdot w_{N+P}^j|$$

introduced by W.

In some cases, the P rows selected to be truncated out of the at least N+P rows available are dynamically determined based at least on the channel/medium conditions, the Channel State Information at the Transmitter (CSIT), the Channel State Information at the Receiver (CSIR), CSI, sensing task objectives, and/or various combinations.

In some embodiments, the precoder 210 may be implemented as a truncated DFT filter and include applying an optimized existent N+P-sized FFT operation (e.g., as implemented in hardware/software accelerators based on discrete or embedded processing units, cores, auxiliary dedicated Field Programmable Gate Arrays processing units, and/or various combinations). An outcome of N-point non-zero FFT components may be selected out of the N+P-point FFT, where the N-point FFT outcome corresponds to selected N harmonics or rows/components of the FFT transform corresponding to W. The discarded P-size FFT components include the discarded rows/harmonic components out of the N+P-FFT operation to obtain W.

In some cases, the selected resulting N-point FFT coefficients are weighted for normalization of the precoding column vectors to unit norm. In one example, the yielded N-point coefficients are weighted by $$\sqrt{\frac{N+P}{N}}$$

to obtain the precoded joint communications and sensing equivalent signal vector x.

In some cases, the DFT block corresponding to the DFT-S-OFDM modulator may be repurposed, as described herein, to generate the equivalent non-orthogonal linear precoding W for joint communications and sensing signal generation x.

Figure 4:
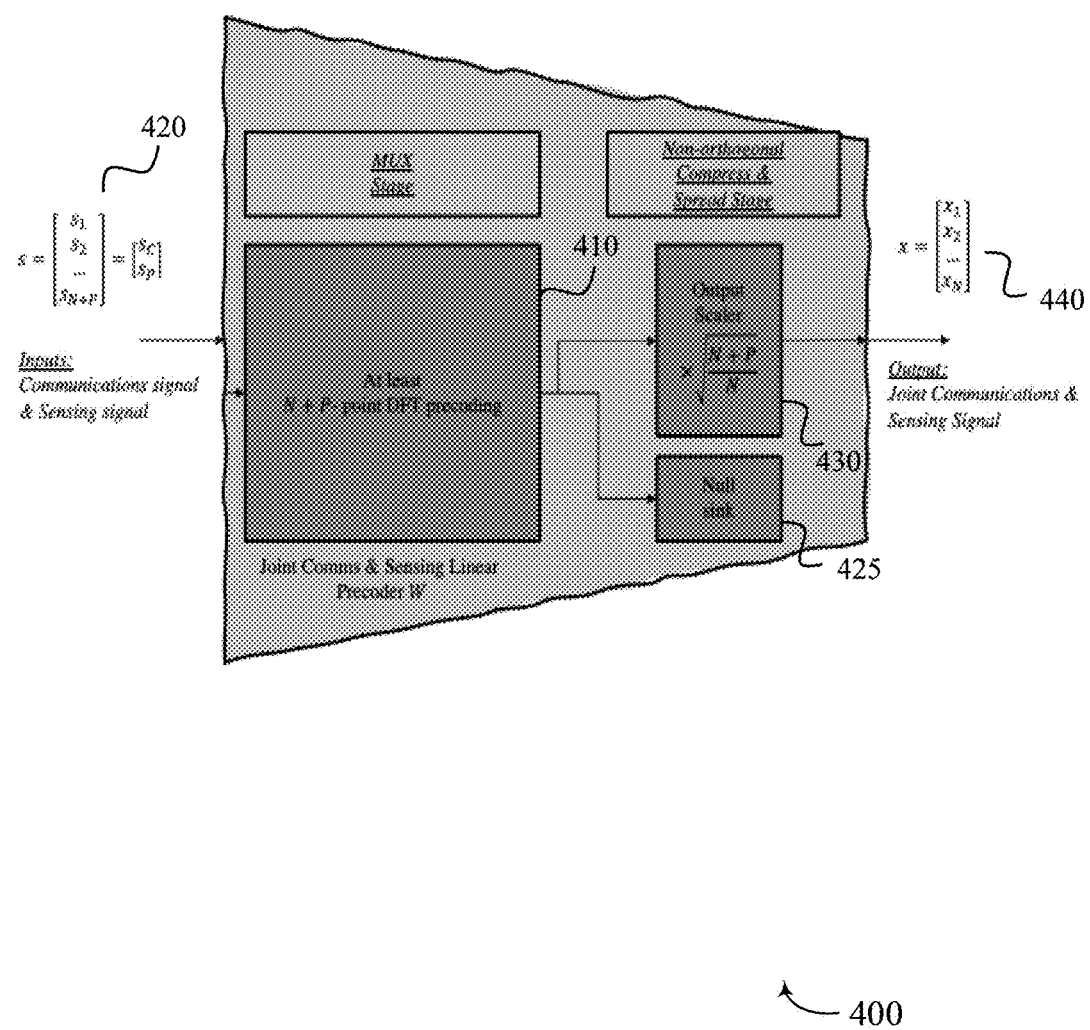
FIG. 4 illustrates example components of a precoder in accordance with aspects of the present disclosure.

FIG. 4 illustrates example components of a precoder 400 in accordance with aspects of the present disclosure. The precoder 400 reflects the precoder 210 based on and having a DFT block 410. The DFT block 410 receives input 420, such as N+P non-zero inputs, corresponding to N communications symbols (e.g., the communications signal) and to P sensing RS symbols (e.g., the sensing RS and/or the sensing signal). The two signals are mapped as described herein (e.g., by simple appending, block interleaving, or element-wise interleaving/permutations) to generate the input signal s, which is further processed by at least an N+P-point DFT transform to generate at least N+P coefficients. Out of the N+P outputs, P are dropped to a null sink 425, where the positions/indices of the P dropped outputs are determined by higher-layer configuration. The remaining N outputs are scaled by $$\sqrt{\frac{N+P}{N}}$$

by an output scaler 430 and form the precoded joint communications and sensing equivalent signal vector 440, denoted as x, which is further mapped onto the inputs to a modulator (e.g., the OFDM modulator).

In some cases, a Tx node may be configured by higher layers to dynamically adapt the waveform between DFT-S-OFDM and the non-orthogonal DFT-based linear precoder W, such as the precoder 400, for joint communications and sensing. A legacy DFT-S-OFDM communications mode employed utilized to convey communications signals only over the DFT-S-OFDM. However, the joint communications and sensing variant of non-orthogonal DFT-S-OFDM may be used to transmit a joint communications and sensing signal over the mechanism and corresponding waveform described herein.

Further, the Tx mode may be configured via higher layer control to adapt the power, or alternatively, the ratio $$\frac{P}{N}$$

of the sensing signal components relative to the communications signal components, for the generation of the joint communications and sensing signal. In some cases, a DFT-S-OFDM legacy waveform may be realized in one transmission occasion by setting the power, or alternatively the number of sensing RS/sensing pilots, P, to zero. In other cases, setting the power, or alternatively the number of sensing RS/sensing pilots, P, to a non-zero value may employ the non-orthogonal DFT-S-OFDM waveform described herein for joint communications and sensing signaling. The adaptive transmitter functional mode and corresponding waveform between legacy DFT-S-OFDM and non-orthogonal DFT-S-OFDM for joint communications and sensing signaling may be configured by radio resource control and/or transmission control information (e.g., in either DL or UL) as an adaptive DFT-S-OFDM waveform.

In some embodiments, such as when MIMO transmissions are enabled, the linear non-orthogonal precoder W, such as the precoder 400, for the generation of joint communications and sensing signal may be combined with MIMO precoding. In some cases, the combination may include an antenna/layer mapping and MIMO precoding block preceding the W precoding for the generation of a MIMO joint communications and sensing signal.

In other cases, the W precoding block may precede the antenna/layer mapping and MIMO precoding processing. Thus, the precoding by W of a joint communications and sensing signal may be layer-common, whereas in other embodiments the precoding by W of a joint communications and sensing signal may be layer-specific.

In some cases, communications signal components precoded into the joint communications and sensing signal may correspond to a Physical Downlink Shared Channel (PDSCH) transmission. In some cases, the communications signal components precoded into the joint communications and sensing signal may correspond to a Physical Uplink Shared Channel (PUSCH). In some cases, the sensing RS signal components precoded into the joint communications and sensing signal may correspond to a Sensing Channel. The sensing channel may be user-specific or broadcast.

In some cases, the non-orthogonal multiplexed joint communication and sensing signal obtained by precoding with W may form the Physical Shared and Sensing Channel (PXSCH-2), which may comprise an uplink realization and format as a Physical Uplink Shared and Sensing Channel (PUSCH-2) or alternatively as a Physical Downlink Shared and Sensing Channel (PDSCH-2). The PXSCH-2 may have its own namespace, configuration and dedicated control signaling.

In some cases, the non-orthogonal multiplexed joint communications and sensing signal, based on the W precoding over OFDM modulation, forms a new waveform for joint communication and sensing (e.g., a Spread Communications and Sensing OFDM (SCS-OFDM)). The SCS-OFDM waveform may be used for PUSCH-2 type channels, PDSCH-2 type channels, or both.

Returning to FIG. 3, as described herein, the joint signal (e.g., the non-orthogonal multiplexed joint communications and sensing signal x) is modulated and transmitted over the physical medium 340 to a receiver node, such as the NE 102 (or, alternatively, a UE). The modulation may be single-carrier or multi-carrier modulation. In some cases, the modulation and subsequent corresponding demodulation at the receiver node may be OFDM-based (e.g., implemented via the IFFT 332 and the 342 FFT, respectively).

Figure 5:
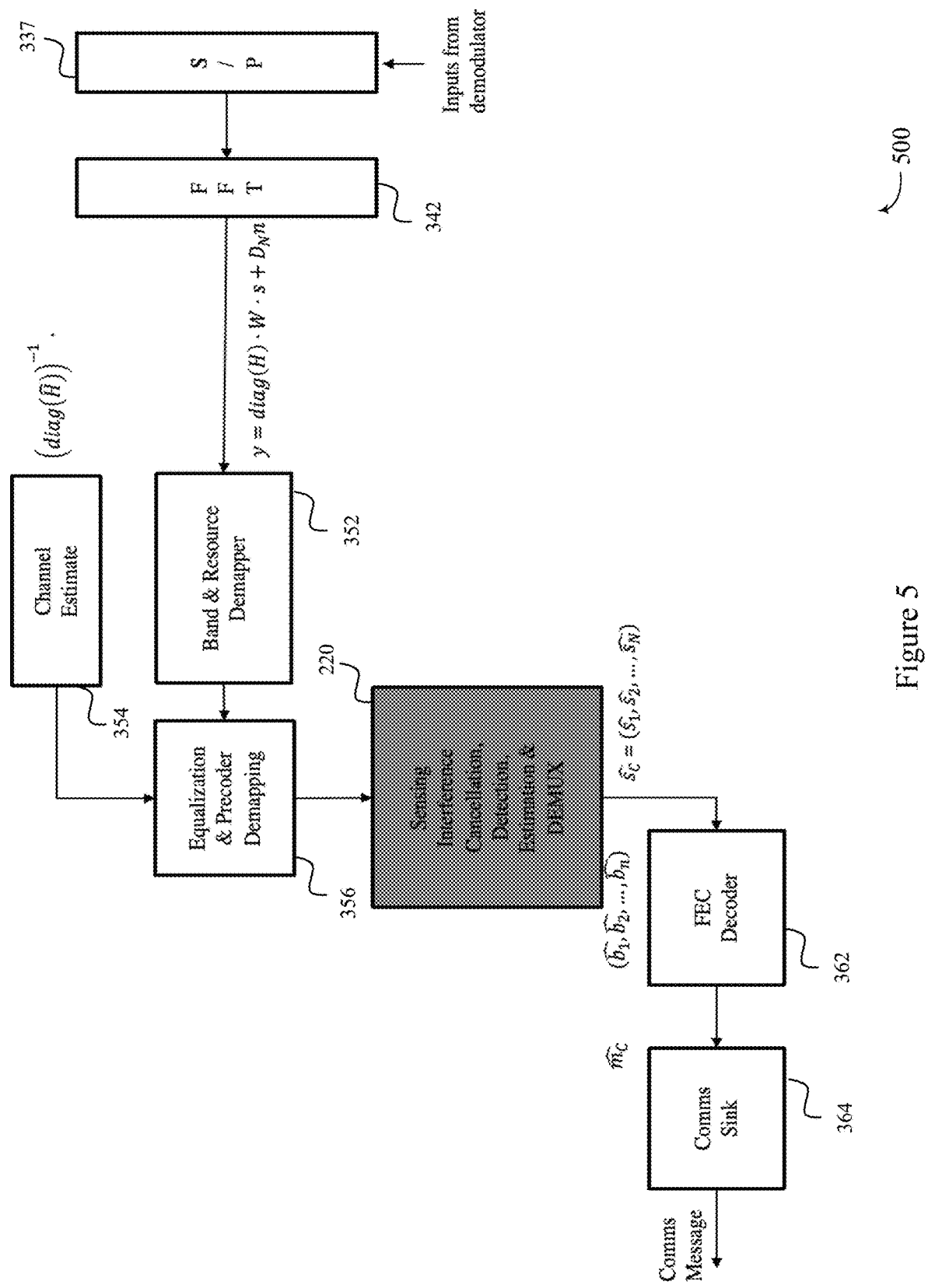
FIG. 5 illustrates example receiver chain processing of a communications message in accordance with aspects of the present disclosure.

The Rx node receives an analog signal via the physical medium 340 and performs or applies various pre-processing steps, such as down-conversion and/or filtering, and digitizes the received signal for baseband and/or intermediate frequency processing. In some cases, a filtering step may be a precursor of the digital-to-analog conversion, a successor of the digital-to-analog conversion, or a combination thereof. In some cases, the filtering may include passband filtering (e.g., low-pass, bandpass, high-pass filtering), carrier phase and timing synchronization, MIMO combining and processing, or any combination, to maximize the received signal SNR and prepare the signal for baseband processing and symbol detection. FIG. 5 illustrates example receiver chain processing 500 in accordance with aspects of the present disclosure (with reference to the components/steps depicted in FIG. 3).

In some embodiments, such as those based on OFDM-based transmission-reception, the processing components 220 of the Rx node detect the separate communications signal (e.g., the communications symbols $s_C$ from the received signal y of the non-orthogonally multiplexed joint communications and sensing signal x), given that the precoding matrix W and sensing RS signal components $s_S$ are known (e.g., based on prior static/semi-static configuration and control signaling, sensing task specific sensing RS, UE-specific sensing RS, and so on). The received signal y may comprise effects of the demodulation, the physical medium, and/or modulation and receiver side baseband noise.

For example, the received signal y post-demodulation may be represented as $$y = D_N \cdot (D_N^H \cdot \text{diag}(H) \cdot D_N) \cdot D_N^H \cdot x + D_N n$$

where the at least N-point DFT $D_N$ corresponds to the FFT transformation of the OFDM demodulator, the at least N-point DFT $D_N^H$ corresponds to the IFFT transformation of the OFDM modulator, the diagonal matrix diag(H) corresponds to the physical medium frequency response, the joint matrix $$D_N^H \cdot \text{diag}(H) \cdot D_N$$

represents the physical medium circulant discrete time convolution transform of the baseband modulated signal $$D_N^H \cdot x,$$

and $D_N n$ is the outstanding noise component post-demodulation at the Rx node. In some cases, the frequency domain processing of the received signal y may be simplified to $y = \text{diag}(H) \cdot W \cdot s + D_N n$, given the expansion of the joint communications and sensing signal x to its precoded representation W·s.

In some embodiments, physical medium one-tap equalization may be applied (via a band and resource demapper 352, a channel estimate 354, and equalization and precoder demapping 356) to generate equivalent representation:

$$(\text{diag}(H))^{-1} \cdot y = W \cdot s + (\text{diag}(H))^{-1} \cdot D_N \cdot n$$

for the detection of the communications signal symbols $s_C$.

In some embodiments, the Rx node applies at least the prior knowledge of the sensing RS symbols and of the precoding transform W to perform a one-stage interference cancellation of the sensing RS signal component over the communications signal component based on the precoded joint communications and sensing signal (e.g., via the sensing processing components 220). The prior knowledge of sensing RS symbols and of the precoding transform may be acquired from an access network, or a peer transmitter node, such as via control signaling. For example, upon sensing RS interference cancellation, the $s_C$ detection is:

$$(\text{diag}(H))^{-1} \cdot y - W_S \cdot s_s = W_C s_C + (\text{diag}(H))^{-1} \cdot D_N \cdot n$$

where W, s are partitioned (e.g., by selecting the corresponding columns mapping to the disjoint sets S and C mapping the sensing RS and communications symbols to the inputs of the precoder W) into their corresponding sensing RS $W_S$, $s_S$ and communications $W_C$, $s_C$ precoded-signal subcomponents of the joint communications and sensing signal. A left-hand side signal vector $(\text{diag}(H))^{-1} \cdot y - W_S \cdot s_S \in \mathbb{C}^{N \times 1}$ is the interference-free received communications signal subcomponent of the joint communications and sensing signal.

In some cases, the control signaling may include control information elements (IEs), such as downlink control information (DCI), uplink control information (UCI), or other control envelopes (e.g., RRC control messages), The IEs may include signaling corresponding to at least determining the sensing RS signal components and/or the precoding linear transform W used to generate the joint communications and sensing signal.

In some cases, the Rx node may apply W-based matched filtering (e.g., via $$W_C^H),$$

least squares filtering, linear minimum mean square filtering, other linear-based detection filtering, non-linear detection filtering, and/or various combinations, to obtain $s_C$. For example, the Rx node may apply first matched filtering via the communications component subprecoder $$W_C^H$$

followed by parallelized Gaussian elimination, utilizing the spectral structure of the Grammian operator $$W_C^H W_C,$$

which is symmetric with diagonal entries 1 via the W construction constrained to unit-norm column vectors.

As another example, the Rx node may directly apply Gaussian elimination and/or least squares on the invertible $W_C$. As another example, the Rx node may apply linear minimum mean square filtering, considering the noise variance and distribution post-demodulation, equalization, and sensing-signal interference cancellation. Further, the Rx node may apply non-linear data-driven learned receivers, such as those combined with other techniques.

In some embodiments, the transmitter and receiver processing may be collocated. For example, the processing collocation may be bounded within the same apparatus, comprising both the transmitter and receiver, performing the precoding and processing of the joint communications and sensing signal.

In some embodiments, the processing collocation may be bounded to a logical processing that is executed under a common processor or central processing unit. The central processing unit may be common to the transmitter node, may be common to the receiver node, or may be part of a network common to both the transmitter and receiver nodes. In embodiments where transmitter and receiver processing may be collocated, both monostatic and bi-static sensing tasks may be executed based on the non-orthogonally precoded joint communications and sensing signaling.

In some embodiments, the transmitter and receiver processing may be non-collocated. In some cases, the transmitter and receiver may include different peer apparatuses communicating with each other and exchanging information data based on the communications component of the joint communications and sensing signal. In other cases, the transmitter and receiver include different peer apparatuses communicating with each other and exchanging sensing RS signaling based on at least the sensing RS signal component of the joint communications and sensing signal.

In one example, the transmitter and receiver may be transmission-reception points of an access network and/or peer entities in a local network. In another example, the transmitter may be an access network transmission-reception node and the receiver may be a UE, or alternatively, the transmitter may be a UE and the receiver may be a transmission-reception node of an access network. In embodiments where the transmitter and receiver processing may be non-collocated, only bi-static sensing tasks may be executed based on the non-orthogonally precoded joint communications and sensing signaling.

In some embodiments, an FEC decoder 362 receives the signal subcomponent, decodes the signal subcomponent, and transfers the decoded signal subcomponent to a communications sink 364 to release the detected communications message for higher layers processing.

As described herein, the systems and methods may resolve issues associated with estimating medium parameters and detecting/estimating differential medium/medium parameters contribution to sensing tasks, along with detecting the communication signal components $s_C$. Example medium parameters include channel impulse response, channel frequency response, channel components magnitude, channel components phase, delay spread profile, Doppler spread profile, delay spread coefficients, Doppler spread coefficients, Doppler shift.

In some cases, a sensing task based on processing and tracking over time multiple medium/medium parameters realizations, or alternatively samples, may be object/obstacle detection, object/obstacle shape estimation, obstacle avoidance, direction of mobility of one or more obstacles, and so on.

In some embodiments, the Rx node, via an interference cancellation component 360, stores the received signal after the demodulation function (e.g., the OFDM demodulator, such as the FFT 342) as a demodulated baseband received signal of the joint communications and sensing signal. The Rx node may subtract the communications signal component from the demodulated baseband received signal of the joint communications and sensing signal. The noisy remainder signal comprises the known sensing RS excitation of the physical channel as follows:

$$y - \text{diag}(\hat{H}) \cdot W_C \cdot \hat{s}_c = \text{diag}(H) \cdot W_s \cdot s_s + D_N \cdot n$$

where the subtraction term $$\text{diag}(\hat{H})^{-1} \cdot W_C \cdot \hat{s}_c$$

comprises the latest estimate of the physical channel and the current detected communications signal components $\hat{s}_c$. As such, $$y_s = y - \text{diag}(\hat{H})^{-1} \cdot W_c \cdot \hat{s}_c$$

may be the sensing RS excitation of physical channel diag(H) in a frequency domain plus noise. The sensing RS excitation of the physical channel may therefore have an instantaneous Sensing Signal Noise Ratio (SSNR) of $$SSNR = \frac{\|\text{diag}(H) \cdot W_S \cdot s_S\|_2^2}{\|n\|_2^2}$$

In some cases, the SSNR is based on a choice of sensing RS symbol coefficients set S and W construction, as described herein, where the detection and estimation of the channel new estimate, or diag($\hat{H}_{new}$), is to be solved when performing a sensing task. The dual of the SSNR is the Communications Signal to Noise Ratio:

$$CSNR = \frac{\|\text{diag}(H) \cdot W_C \cdot s_C\|_2^2}{\|n\|_2^2}$$

Figure 6:
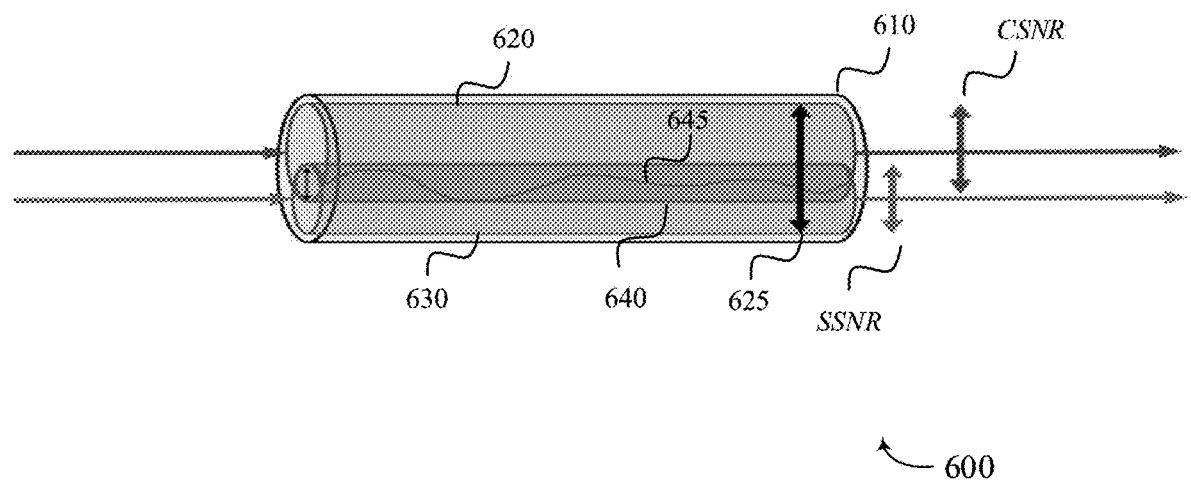
FIG. 6 illustrates an example channel for a joint communications and sensing signal in accordance with aspects of the present disclosure.

The CSNR may be obtained by removing the sensing RS interference cancellation from the demodulated baseband received signal of the joint communications and sensing signal. The relationship between the SSNR and CSNR relative to a compound SNR of the joint communications and sensing signal, $$SNR = \frac{\|\text{diag}(H) \cdot W \cdot s\|_2^2}{\|n\|_2^2},$$

is depicted in FIG. 6.

FIG. 6 illustrates an example channel 600 for a joint communications and sensing signal in accordance with aspects of the present disclosure. Physical channel resources 610 includes a communications channel 620 and a sensing channel 630, which contain a precoder-based joint signal 625. A non-orthogonal multiplexed interference channel 640 arises, and includes instantaneous (e.g., symbol-level) interference 645.

In some cases, the instantaneous interference 645 between the communications channel 620, or representation, and the sensing channel 630, or representation in the joint communications and sensing space non-orthogonally multiplexed may be constructive or destructive, depending on the precoding linear transform W, the communications and sensing symbols s, and the physical channel instance diag(H). Thus, the type of interference may not be perfectly controllable. However, from the Rx node, the interference may be resolved and cancelled for both communications and sensing detection, as described herein.

Figure 7:
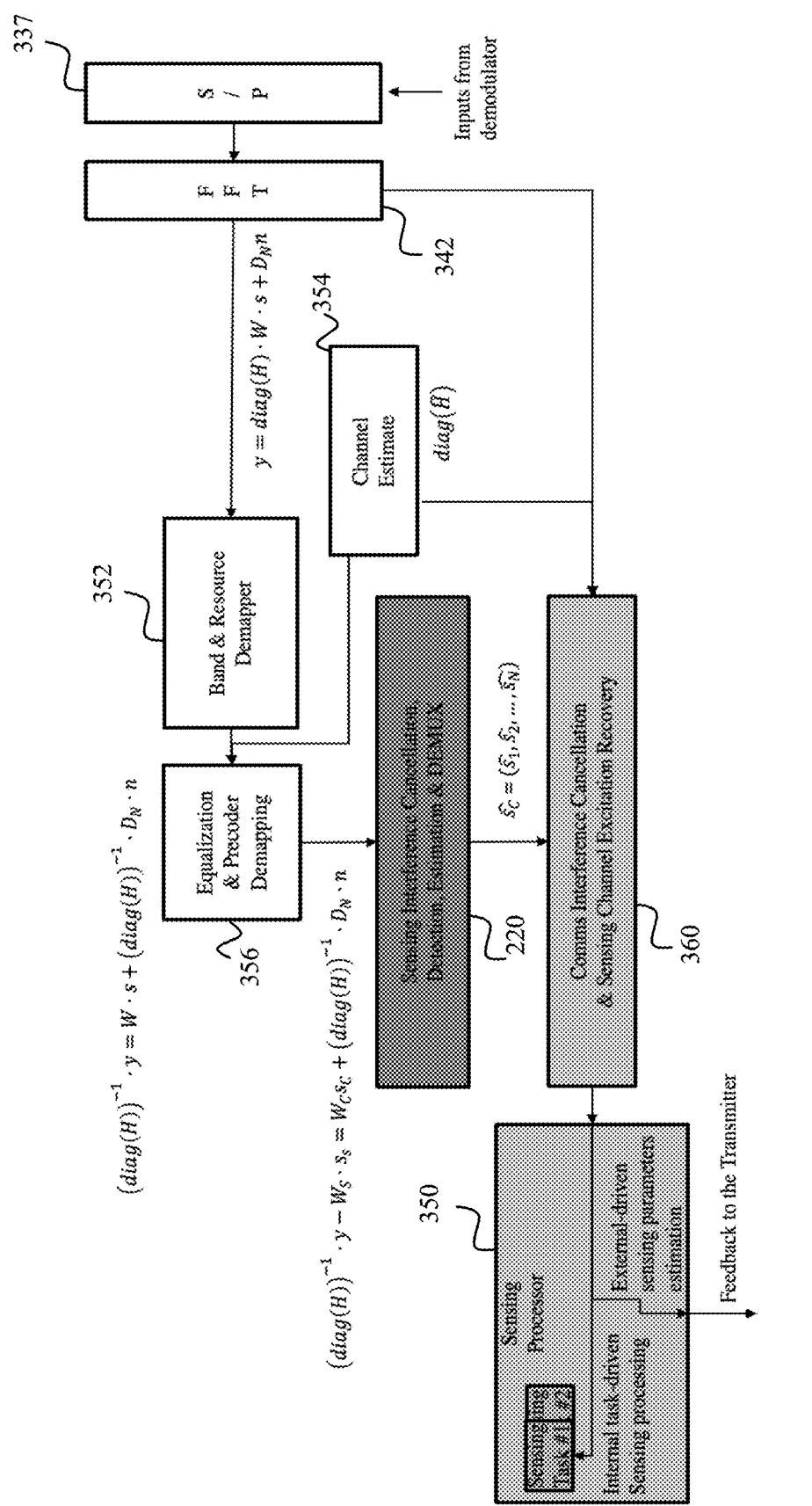
FIG. 7 illustrates example targeting processing of sensing parameters to sensing tasks in accordance with aspects of the present disclosure.

In some embodiments, the Rx node may determine a new estimate of sensing parameters based at least on the sensing task objectives, the demodulated baseband received signal of the joint communications and sensing signal, the knowledge of sensing RS signal components, the latest physical channel knowledge and the current sensing RS excitation of physical channel, or various combinations. FIG. 7 illustrates example targeting of sensing parameters to sensing tasks 700 in accordance with aspects of the present disclosure (with reference to the components/steps depicted in FIG. 3).

As described herein, the obtained sensing parameter estimates may be provided to the sensing processor 350, which may be within the receiver apparatus. In some cases, the sensing parameter estimates may be transmitted to the Tx node or another network node, or otherwise mapped to the sensing tasks.

Thus, in various embodiments, the systems and methods may enhance a transmitter (e.g., the UE 104) to non-orthogonally multiplex, compress, and spread independent communications and sensing signals into a joint communications and sensing signal mapped to available physical resources, which are less than the signaled independent communications and sensing signals components. In some cases, the transmitter includes a linear precoder (e.g., precoder 210 or 400) and a receiver includes an interference cancellation and detection component (e.g., component 220).

Using the various implementations, a wireless communications system may perform receiver-side disambiguation and processing of joint communications and sensing signals to individually benefit estimation and detection for dual information channels (e.g., communication channels and sensing channels), which simultaneously leveraging the available physical channel resources, among other benefits.

Figure 8:
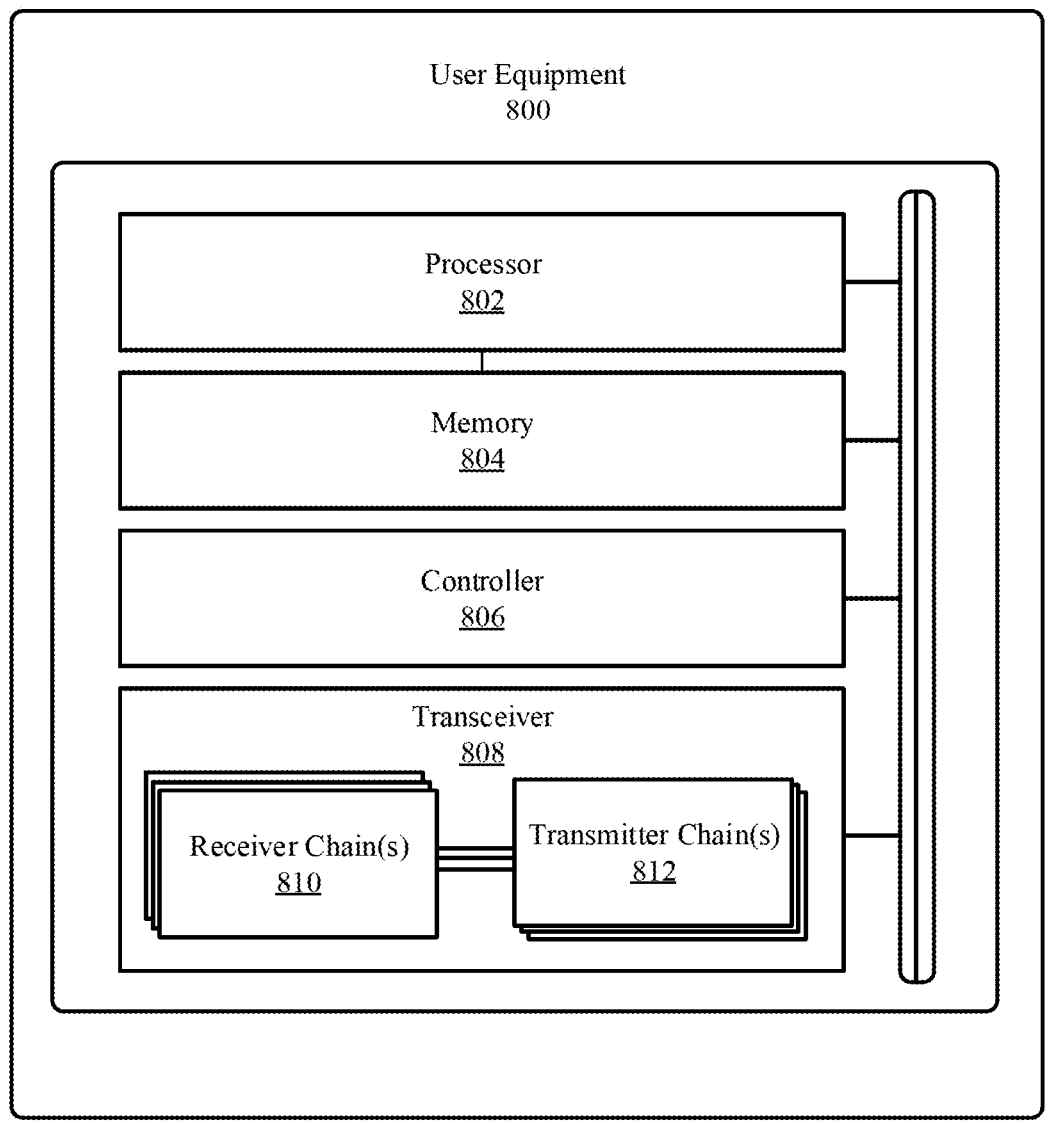
FIG. 8 illustrates an example of a UE in accordance with aspects of the present disclosure.

FIG. 8 illustrates an example of a UE 800 in accordance with aspects of the present disclosure. The UE 800 may include a processor 802, a memory 804, a controller 806, and a transceiver 808. The processor 802, the memory 804, the controller 806, or the transceiver 808, or various combinations thereof or various components thereof may be examples of means for performing various aspects of the present disclosure as described herein. These components may be coupled (e.g., operatively, communicatively, functionally, electronically, electrically) via one or more interfaces.

The processor 802, the memory 804, the controller 806, or the transceiver 808, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 802 may include an intelligent hardware device (e.g., a general-purpose processor, a DSP, a CPU, an ASIC, an FPGA, or any combination thereof). In some implementations, the processor 802 may be configured to operate the memory 804. In some other implementations, the memory 804 may be integrated into the processor 802. The processor 802 may be configured to execute computer-readable instructions stored in the memory 804 to cause the UE 800 to perform various functions of the present disclosure.

The memory 804 may include volatile or non-volatile memory. The memory 804 may store computer-readable, computer-executable code including instructions when executed by the processor 802 cause the UE 800 to perform various functions described herein. The code may be stored in a non-transitory computer-readable medium such the memory 804 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 802 and the memory 804 coupled with the processor 802 may be configured to cause the UE 800 to perform one or more of the functions described herein (e.g., executing, by the processor 802, instructions stored in the memory 804). For example, the processor 802 may support wireless communication at the UE 800 in accordance with examples as disclosed herein. The UE 800 may be configured to support a means for determining a precoder for two or more sets of symbols, including a first set of symbols associated with an information source and a second set of symbols associated with a sensing reference source, and generating a communication and sensing signal by applying the precoder to a set of independent symbols generated from the two or more sets of symbols.

The controller 806 may manage input and output signals for the UE 800. The controller 806 may also manage peripherals not integrated into the UE 800. In some implementations, the controller 806 may utilize an operating system such as iOS®, ANDROID®, WINDOWS®, or other operating systems. In some implementations, the controller 806 may be implemented as part of the processor 802.

In some implementations, the UE 800 may include at least one transceiver 808. In some other implementations, the UE 800 may have more than one transceiver 808. The transceiver 808 may represent a wireless transceiver. The transceiver 808 may include one or more receiver chains 810, one or more transmitter chains 812, or a combination thereof.

A receiver chain 810 may be configured to receive signals (e.g., control information, data, packets) over a wireless medium. For example, the receiver chain 810 may include one or more antennas for receive the signal over the air or wireless medium. The receiver chain 810 may include at least one amplifier (e.g., a low-noise amplifier (LNA)) configured to amplify the received signal. The receiver chain 810 may include at least one demodulator configured to demodulate the receive signal and obtain the transmitted data by reversing the modulation technique applied during transmission of the signal. The receiver chain 810 may include at least one decoder for decoding the processing the demodulated signal to receive the transmitted data.

A transmitter chain 812 may be configured to generate and transmit signals (e.g., control information, data, packets). The transmitter chain 812 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 812 may also include at least one power amplifier configured to amplify the modulated signal to an appropriate power level suitable for transmission over the wireless medium. The transmitter chain 812 may also include one or more antennas for transmitting the amplified signal into the air or wireless medium.

Figure 9:
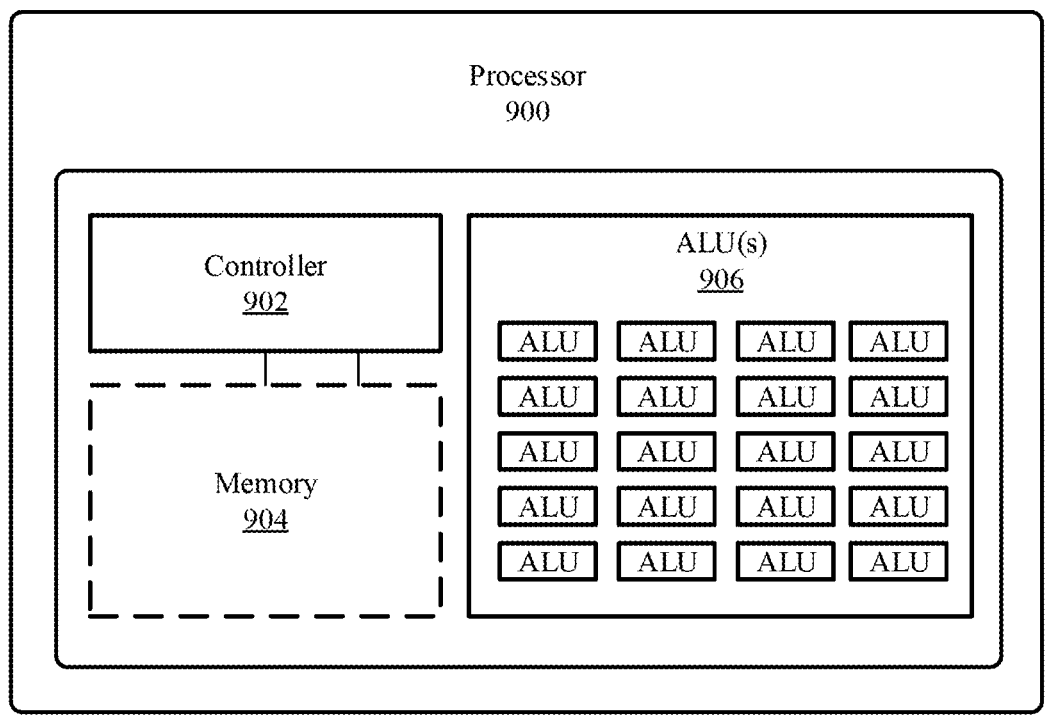
FIG. 9 illustrates an example of a processor in accordance with aspects of the present disclosure.

FIG. 9 illustrates an example of a processor 900 in accordance with aspects of the present disclosure. The processor 900 may be an example of a processor configured to perform various operations in accordance with examples as described herein. The processor 900 may include a controller 902 configured to perform various operations in accordance with examples as described herein. The processor 900 may optionally include at least one memory 904, which may be, for example, an L1/L2/L3 cache. Additionally, or alternatively, the processor 900 may optionally include one or more arithmetic-logic units (ALUs) 906. One or more of these components may be in electronic communication or otherwise coupled (e.g., operatively, communicatively, functionally, electronically, electrically) via one or more interfaces (e.g., buses).

The processor 900 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 900) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others).

The controller 902 may be configured to manage and coordinate various operations (e.g., signaling, receiving, obtaining, retrieving, transmitting, outputting, forwarding, storing, determining, identifying, accessing, writing, reading) of the processor 900 to cause the processor 900 to support various operations in accordance with examples as described herein. For example, the controller 902 may operate as a control unit of the processor 900, generating control signals that manage the operation of various components of the processor 900. These control signals include enabling or disabling functional units, selecting data paths, initiating memory access, and coordinating timing of operations.

The controller 902 may be configured to fetch (e.g., obtain, retrieve, receive) instructions from the memory 904 and determine subsequent instruction(s) to be executed to cause the processor 900 to support various operations in accordance with examples as described herein. The controller 902 may be configured to track memory address of instructions associated with the memory 904. The controller 902 may be configured to decode instructions to determine the operation to be performed and the operands involved. For example, the controller 902 may be configured to interpret the instruction and determine control signals to be output to other components of the processor 900 to cause the processor 900 to support various operations in accordance with examples as described herein. Additionally, or alternatively, the controller 902 may be configured to manage flow of data within the processor 900. The controller 902 may be configured to control transfer of data between registers, arithmetic logic units (ALUs), and other functional units of the processor 900.

The memory 904 may include one or more caches (e.g., memory local to or included in the processor 900 or other memory, such RAM, ROM, DRAM, SDRAM, SRAM, MRAM, flash memory, etc. In some implementations, the memory 904 may reside within or on a processor chipset (e.g., local to the processor 900). In some other implementations, the memory 904 may reside external to the processor chipset (e.g., remote to the processor 900).

The memory 904 may store computer-readable, computer-executable code including instructions that, when executed by the processor 900, cause the processor 900 to perform various functions described herein. The code may be stored in a non-transitory computer-readable medium such as system memory or another type of memory. The controller 902 and/or the processor 900 may be configured to execute computer-readable instructions stored in the memory 904 to cause the processor 900 to perform various functions. For example, the processor 900 and/or the controller 902 may be coupled with or to the memory 904, the processor 900, the controller 902, and the memory 904 may be configured to perform various functions described herein. In some examples, the processor 900 may include multiple processors and the memory 904 may include multiple memories. One or more of the multiple processors may be coupled with one or more of the multiple memories, which may, individually or collectively, be configured to perform various functions herein.

The one or more ALUs 906 may be configured to support various operations in accordance with examples as described herein. In some implementations, the one or more ALUs 906 may reside within or on a processor chipset (e.g., the processor 900). In some other implementations, the one or more ALUs 906 may reside external to the processor chipset (e.g., the processor 900). One or more ALUs 906 may perform one or more computations such as addition, subtraction, multiplication, and division on data. For example, one or more ALUs 906 may receive input operands and an operation code, which determines an operation to be executed. One or more ALUs 906 be configured with a variety of logical and arithmetic circuits, including adders, subtractors, shifters, and logic gates, to process and manipulate the data according to the operation. Additionally, or alternatively, the one or more ALUs 906 may support logical operations such as AND, OR, exclusive-OR (XOR), not-OR (NOR), and not-AND (NAND), enabling the one or more ALUs 906 to handle conditional operations, comparisons, and bitwise operations.

The processor 900 may support wireless communication in accordance with examples as disclosed herein. The UE processor 900 may be configured to support a means for determining a precoder for two or more sets of symbols, including a first set of symbols associated with an information source and a second set of symbols associated with a sensing reference source, and generating a communication and sensing signal by applying the precoder to a set of independent symbols generated from the two or more sets of symbols.

Figure 10:
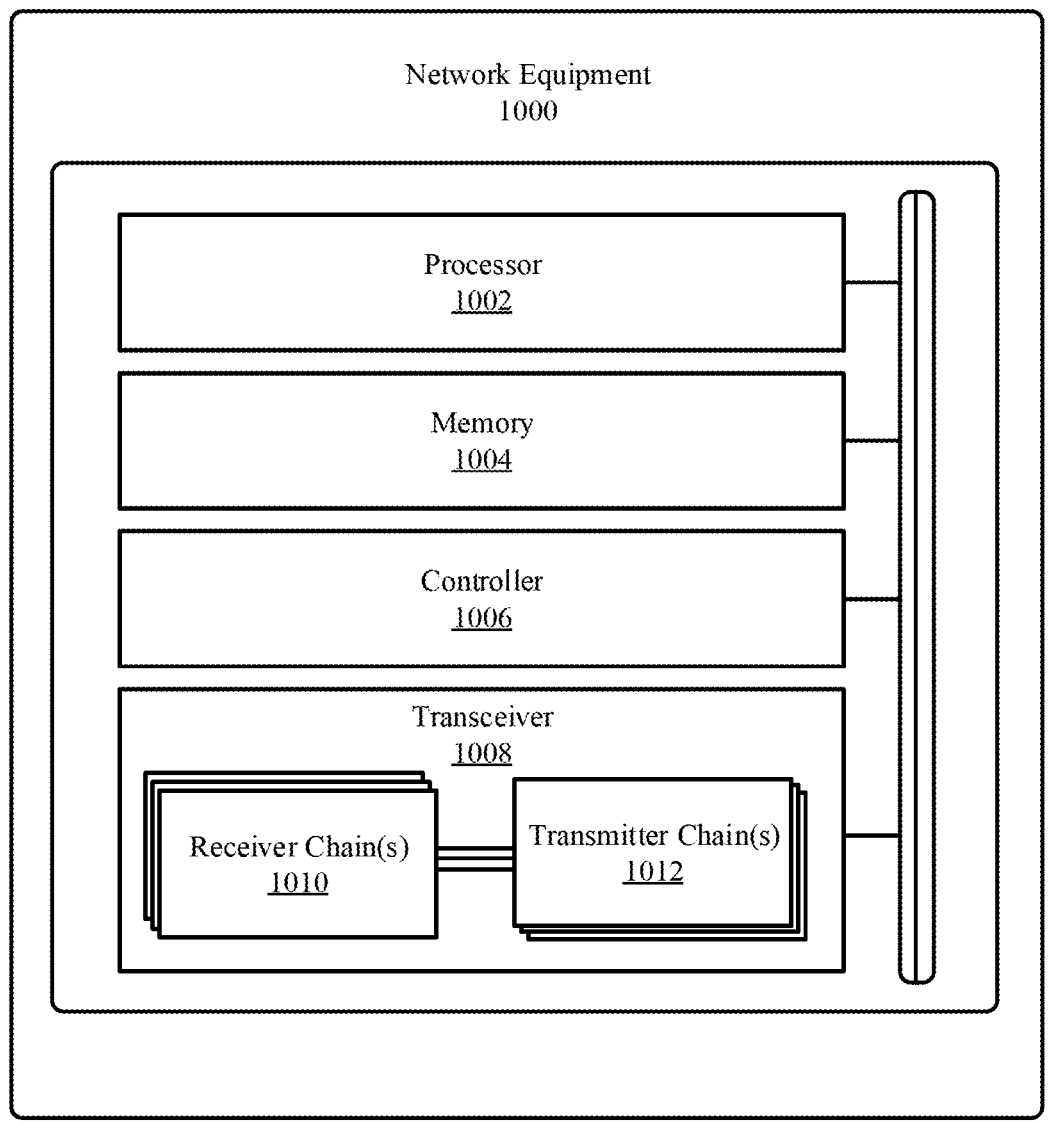
FIG. 10 illustrates an example of a network equipment (NE) in accordance with aspects of the present disclosure.

FIG. 10 illustrates an example of a NE 1000 in accordance with aspects of the present disclosure. The NE 1000 may include a processor 1002, a memory 1004, a controller 1006, and a transceiver 1008. The processor 1002, the memory 1004, the controller 1006, or the transceiver 1008, or various combinations thereof or various components thereof may be examples of means for performing various aspects of the present disclosure as described herein. These components may be coupled (e.g., operatively, communicatively, functionally, electronically, electrically) via one or more interfaces.

The processor 1002, the memory 1004, the controller 1006, or the transceiver 1008, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 1002 may include an intelligent hardware device (e.g., a general-purpose processor, a DSP, a CPU, an ASIC, an FPGA, or any combination thereof). In some implementations, the processor 1002 may be configured to operate the memory 1004. In some other implementations, the memory 1004 may be integrated into the processor 1002. The processor 1002 may be configured to execute computer-readable instructions stored in the memory 1004 to cause the NE 1000 to perform various functions of the present disclosure.

The memory 1004 may include volatile or non-volatile memory. The memory 1004 may store computer-readable, computer-executable code including instructions when executed by the processor 1002 cause the NE 1000 to perform various functions described herein. The code may be stored in a non-transitory computer-readable medium such the memory 1004 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 1002 and the memory 1004 coupled with the processor 1002 may be configured to cause the NE 1000 to perform one or more of the functions described herein (e.g., executing, by the processor 1002, instructions stored in the memory 1004). For example, the processor 1002 may support wireless communication at the NE 1000 in accordance with examples as disclosed herein. The NE 1000 may be configured to support a means for receiving a communication and sensing signal that comprises a precoded set of independent symbols generated from two or more sets of symbols, including a first set of symbols associated with an information source and a second set of symbols associated with a sensing reference source, receiving an indication of a configuration associated with the communication and sensing signal, applying the configuration to cancel interference of a signal component from the communication and sensing signal to generate an interference-free signal component, and performing a detection and estimation task that is based on the interference-free signal component.

The controller 1006 may manage input and output signals for the NE 1000. The controller 1006 may also manage peripherals not integrated into the NE 1000. In some implementations, the controller 1006 may utilize an operating system such as iOS®, ANDROID®, WINDOWS®, or other operating systems. In some implementations, the controller 1006 may be implemented as part of the processor 1002.

In some implementations, the NE 1000 may include at least one transceiver 1008. In some other implementations, the NE 1000 may have more than one transceiver 1008. The transceiver 1008 may represent a wireless transceiver. The transceiver 1008 may include one or more receiver chains 1010, one or more transmitter chains 1012, or a combination thereof.

A receiver chain 1010 may be configured to receive signals (e.g., control information, data, packets) over a wireless medium. For example, the receiver chain 1010 may include one or more antennas for receive the signal over the air or wireless medium. The receiver chain 1010 may include at least one amplifier (e.g., a low-noise amplifier (LNA)) configured to amplify the received signal. The receiver chain 1010 may include at least one demodulator configured to demodulate the receive signal and obtain the transmitted data by reversing the modulation technique applied during transmission of the signal. The receiver chain 1010 may include at least one decoder for decoding the processing the demodulated signal to receive the transmitted data.

A transmitter chain 1012 may be configured to generate and transmit signals (e.g., control information, data, packets). The transmitter chain 1012 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 1012 may also include at least one power amplifier configured to amplify the modulated signal to an appropriate power level suitable for transmission over the wireless medium. The transmitter chain 1012 may also include one or more antennas for transmitting the amplified signal into the air or wireless medium.

As described herein, various implementations may include the UE 800 as a Tx node or Rx node, the processor 900 as the Tx node or Rx node, and/or the NE 1000 as the Tx node or Rx node.

Figure 11:
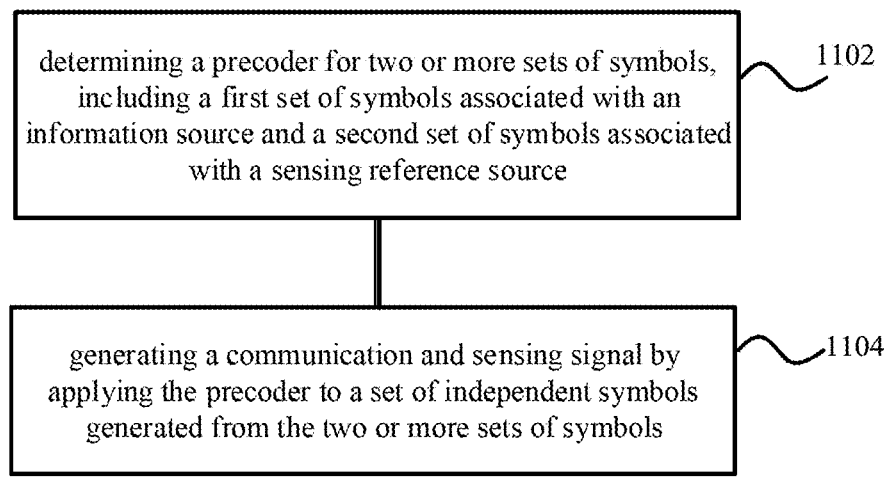
FIG. 11 illustrates a flowchart of a method performed by a UE in accordance with aspects of the present disclosure.

FIG. 11 illustrates a flowchart of a method in accordance with aspects of the present disclosure. The operations of the method may be implemented by a UE as described herein. In some implementations, the UE may execute a set of instructions to control the function elements of the UE to perform the described functions.

At 1102, the method may include determining a precoder for two or more sets of symbols, including a first set of symbols associated with an information source and a second set of symbols associated with a sensing reference source. The operations of 1102 may be performed in accordance with examples as described herein. In some implementations, aspects of the operations of 1102 may be performed by a UE as described with reference to FIG. 8.

At 1104, the method may include generating a communication and sensing signal by applying the precoder to a set of independent symbols generated from the two or more sets of symbols. The operations of 1104 may be performed in accordance with examples as described herein. In some implementations, aspects of the operations of 1104 may be performed by a UE as described with reference to FIG. 8.

It should be noted that the method described herein describes a possible implementation, and that the operations and the steps may be rearranged or otherwise modified and that other implementations are possible.

Figure 12:
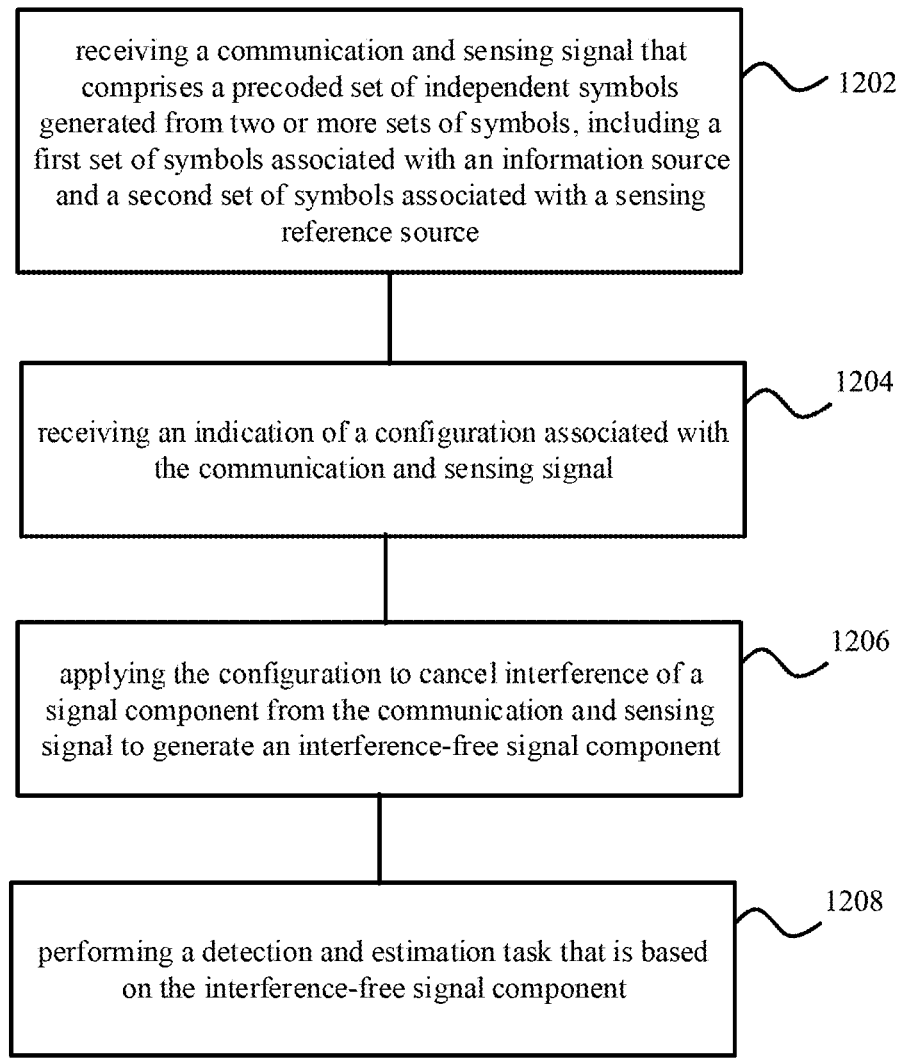
FIG. 12 illustrates a flowchart of a method performed by an NE in accordance with aspects of the present disclosure.

FIG. 12 illustrates a flowchart of a method in accordance with aspects of the present disclosure. The operations of the method may be implemented by an NE as described herein. In some implementations, the NE may execute a set of instructions to control the function elements of the NE to perform the described functions.

At 1202, the method may include receiving a communication and sensing signal that comprises a precoded set of independent symbols generated from two or more sets of symbols, including a first set of symbols associated with an information source and a second set of symbols associated with a sensing reference source. The operations of 1202 may be performed in accordance with examples as described herein. In some implementations, aspects of the operations of 1202 may be performed by an NE as described with reference to FIG. 10.

At 1204, the method may include receiving an indication of a configuration associated with the communication and sensing signal. The operations of 1204 may be performed in accordance with examples as described herein. In some implementations, aspects of the operations of 1204 may be performed by an NE as described with reference to FIG. 10.

At 1206, the method may include applying the configuration to cancel interference of a signal component from the communication and sensing signal to generate an interference-free signal component. The operations of 1206 may be performed in accordance with examples as described herein. In some implementations, aspects of the operations of 1206 may be performed by an NE as described with reference to FIG. 10.

At 1208, the method may include performing a detection and estimation task that is based on the interference-free signal component. The operations of 1208 may be performed in accordance with examples as described herein. In some implementations, aspects of the operations of 1208 may be performed by an NE as described with reference to FIG. 10.

It should be noted that the method described herein describes a possible implementation, and that the operations and the steps may be rearranged or otherwise modified and that other implementations are possible.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A transmission node for wireless communication, comprising:
    at least one memory; and
    at least one processor coupled with the at least one memory and configured to cause the transmission node to:
        determine a precoder for two or more sets of symbols, including:
            a first set of symbols associated with an information source; and
            a second set of symbols associated with a sensing reference source; and
        generate a communication and sensing signal by applying the precoder to a set of independent symbols generated from the two or more sets of symbols.

2. The transmission node of claim 1, wherein the generated communication and sensing signal combines the first set of symbols and the second set of symbols.

3. The transmission node of claim 1, wherein the at least one processor is further configured to cause the transmission node to:
    map the generated communication and sensing signal to at least one transmission layer and a set of physical transmission resources; and
    transmit, to a receiving node, an indication of a configuration of the generated communication and sensing signal.

4. The transmission node of claim 3, wherein the configuration of the generated communication and sensing signal includes:
    a first information element that indicates the determined precoder; and
    a second information element that indicates the first set of symbols or the second set of symbols.

5. The transmission node of claim 4, wherein the first information element indicates at least one of:
    one or more truncated discrete Fourier transform (DFT) columns of a base DFT precoder;
    one or more truncated DFT rows of a base DFT precoder;
    a size indication of the base DFT precoder;

a precoder type;
a tabulated indication of an applied precoder from one or more available precoder realizations; and
an applied permutation to the two or more sets of symbols as inputs to the precoder.

6. The transmission node of claim 4, wherein the second information element indicates at least one of:
an index subset mapping the subset of independent symbols generated from the second set of symbols;
symbol values of the subset of independent symbols selected via the index subset;
a type of the second set of symbols; and
an applied permutation to the two or more sets of symbols as inputs to the precoder.

7. The transmission node of claim 1, wherein the at least one processor is configured to cause the transmission node to:
obtain the generated communication and sensing signal by performing linear precoding via the determined precoder.

8. The transmission node of claim 1, wherein the at least one processor is configured to cause the transmission node to:
generate a first subset of the set of independent symbols that comprises a communications signal component; and
generate a second subset of the set of independent symbols that comprises a sensing reference signal component.

9. The transmission node of claim 8, wherein the at least one processor is further configured to cause the transmission node to:
non-orthogonally multiplex the communications signal component and the sensing reference signal component.

10. The transmission node of claim 1, wherein the at least one processor is further configured to cause the transmission node to:
compress and spread the set of independent symbols onto a transmission layer and a set of physical transmission resources.

11. The transmission node of claim 1, wherein the at least one processor is further configured to cause the transmission node to:
obtain the determined precoder via a truncated discrete Fourier transform (DFT).

12. The transmission node of claim 1, wherein the at least one processor is further configured to cause the transmission node to:
obtain the determined precoder via a spherical codebook S(N+P, N, t) that comprises:
at least N+P codewords selected on a surface of a complex unit N-sphere with a minimum angular distance limited by a threshold acos(t),
wherein N is a number of independent symbols generated by the first set of symbols and further represents at least a number of physical transmission resources, and
wherein P is a number of independent symbols generated by the second set of symbols.

13. The transmission node of claim 1, wherein the at least one processor is further configured to cause the transmission node to:
apply a permutation to the set of independent symbols before generating the communication and sensing signal.

14. The transmission node of claim 13, wherein the permutation includes mixing the set of independent symbols by:
appending independent symbols generated from the second set of symbols to independent symbols generated from the first set of symbols;
block interleaving the independent symbols generated from the first set of symbols with the independent symbols generated from the second set of symbols;
element-wise interleaving the independent symbols generated from the first set of symbols with the independent symbols generated from the second set of symbols; or combinations thereof.

15. A receiving node for wireless communication, comprising:
at least one memory; and
at least one processor coupled with the at least one memory and configured to cause the receiving node to:
receive a communication and sensing signal that comprises a precoded set of independent symbols generated from two or more sets of symbols, including:
a first set of symbols associated with an information source; and
a second set of symbols associated with a sensing reference source;
receive an indication of a configuration associated with the communication and sensing signal;
apply the configuration to cancel interference of a signal component from the communication and sensing signal to generate an interference-free signal component; and
perform a detection and estimation task that is based on the interference-free signal component.

16. The receiving node of claim 15, wherein:
a first subset of the precoded set of independent symbols comprises a communications signal component; and
a second subset of the precoded set of independent symbols comprises a sensing reference signal component.

17. The receiving node of claim 15, wherein the configuration of the communication and sensing signal includes:
a first information element that indicates a precoder used to combine the two or more sets of symbols; and
a second information element that indicates the first set of symbols or the second set of symbols.

18. The receiving node of claim 15, wherein the detection and estimation task comprises:
recovering a subset of the precoded set of independent symbols that originates from the first set of symbols by cancelling the interference of the second set of symbols corresponding to the sensing reference source from the communications and sensing signal; or
recovering a set of sensing parameters of a physical propagation medium based on a subset of the precoded set of independent symbols that originates from the second set of symbols corresponding to the sensing reference source by cancelling the interference of the first set of symbols from the communications and sensing signal.

19. A processor for wireless communication, comprising:
at least one controller coupled with at least one memory and configured to cause the processor to:
determine a precoder for two or more sets of symbols, including:
a first set of symbols associated with an information source; and a second set of symbols associated with a sensing reference source; and generate a communication and sensing signal by applying the precoder to a set of independent symbols generated from the two or more sets of symbols.

20. A method performed by a network node, the method comprising:

receiving a communication and sensing signal that comprises a precoded set of independent symbols generated from two or more sets of symbols, including:

a first set of symbols associated with an information source; and a second set of symbols associated with a sensing reference source;

receiving an indication of a configuration associated with the communication and sensing signal;

applying the configuration to cancel interference of a signal component from the communication and sensing signal to generate an interference-free signal component; and performing a detection and estimation task that is based on the interference-free signal component.

* * * * *